United States Patent
Bianchi et al.

(10) Patent No.: US 10,156,380 B2
(45) Date of Patent: Dec. 18, 2018

(54) DUCT CONNECTION DEVICE

(71) Applicant: Unique Fabricating, Inc., Auburn Hills, MI (US)

(72) Inventors: Daniel Bianchi, Auburn Hills, MI (US); Bradley J. Hazen, Rochester, MI (US)

(73) Assignee: UNIQUE FABRICATING, INC., Auburn Hills, MI (US)

( * ) Notice: Subject to any disclaimer, the term of this patent is extended or adjusted under 35 U.S.C. 154(b) by 234 days.

(21) Appl. No.: 14/816,519

(22) Filed: Aug. 3, 2015

(65) Prior Publication Data
US 2017/0038090 A1 Feb. 9, 2017

(51) Int. Cl.
| | |
|---|---|
| *F24F 13/02* | (2006.01) |
| *F16L 9/00* | (2006.01) |
| *F16L 9/17* | (2006.01) |
| *F16L 31/00* | (2006.01) |

(52) U.S. Cl.
CPC .......... *F24F 13/0209* (2013.01); *F16L 9/003* (2013.01); *F16L 9/17* (2013.01); *F16L 31/00* (2013.01)

(58) Field of Classification Search
CPC . F16L 9/17; F16L 9/003; F16L 13/163; F16L 13/103; F16L 25/0009; F24F 13/0209
USPC .................................................. 285/424, 382
See application file for complete search history.

(56) References Cited

U.S. PATENT DOCUMENTS

| | | | | |
|---|---|---|---|---|
| 1,487,389 | A * | 3/1924 | King .......................... | 285/382 X |
| 3,758,139 | A * | 9/1973 | Meserole ................... | 285/424 X |
| 3,768,457 | A * | 10/1973 | Beasey ...................... | 285/424 X |
| 4,123,093 | A * | 10/1978 | Newland .............. | F24F 13/0209 285/424 X |
| 5,314,212 | A * | 5/1994 | Sanders .............. | F24F 13/0209 285/424 X |
| 5,918,644 | A * | 7/1999 | Haack ...................... | F16L 9/003 |
| 5,934,710 | A * | 8/1999 | Le Foll ..................... | 285/424 X |
| 6,364,374 | B1 * | 4/2002 | Noone ....................... | 285/424 X |
| 2001/0026048 | A1 * | 10/2001 | Proctor ............... | F24F 13/0209 |

* cited by examiner

*Primary Examiner* — Greg Binda
*Assistant Examiner* — Zachary T Dragicevich
(74) *Attorney, Agent, or Firm* — Bill C. Panagos; Daniel S. Checkowsky; Panagos Law Group PLLC

(57) ABSTRACT

A duct is shaped and sized for connectability to a vent (or vent adaptor). The duct has an end portion with a flared section separated from a tapered flap section by a lip. The flaps are foldable inwardly at the lip upon engagement with the vent, and airflow through the duct presses the folded flaps against the vent for additional securement of the connection between same. Additional securement and stability may be provided by an adhesive retaining a tapered flap section to a flared section following inward folding of the tapered flap section.

18 Claims, 2 Drawing Sheets

DUCT CONNECTION DEVICE

TECHNICAL FIELD

This disclosure relates to connection mechanisms. Such connection mechanisms can be in devices can be used for light weight ducts, including plastic, all-foam or substantially all-foam ducts. Light weight ducts that have many commercial uses, including in vehicles such as automobiles, airplanes, industrial vehicles, recreational vehicles and boats. The connection device can facilitate connection between many assemblies, including but not limited to duct-to-vent, duct-to-duct, duct-to-vent adapter, among others. In such connections, the elements being connected may be of the same or different materials. That is, among other configurations, a foam part may be connecting to a foam part, or a plastic part may be connecting to foam part.

BACKGROUND

Generally, in the exemplary field of HVAC duct work for vehicles and other applications, it is desirable to have ducts that are light weight and flexible. It is also desirable to have ducts that are easy to connect to other ducts and/or vents or add-ons in a manner that readily creates a secure connection. It is also desirable to manufacture ducts and connection devices efficiently, including but not limited to ducts that have structure integrally formed in same that permits easy and secure connections.

Thus, lightweight foam ducts are needed with improved connectability. Methods for making such ducts are also needed.

DETAILED DESCRIPTION

All figures and examples herein are intended to be non-limiting; they are mere exemplary iterations and/or embodiments of the claims appended to the end of this description. Modifications to structure, materials, the order of steps in procedures, temperature ranges, are contemplated.

Figure 1:
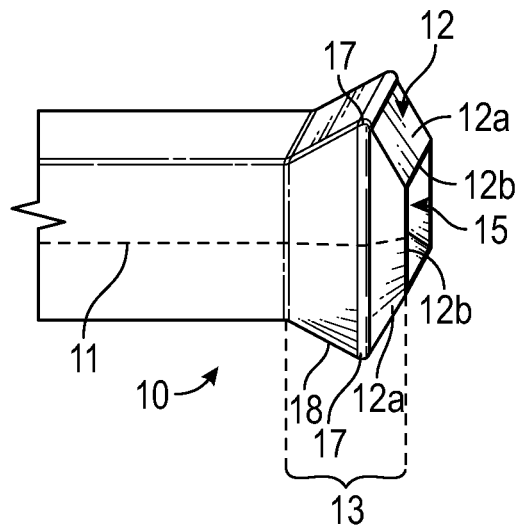
FIG. 1 is a perspective view of an end portion of exemplary hollow duct.
Figure 2:
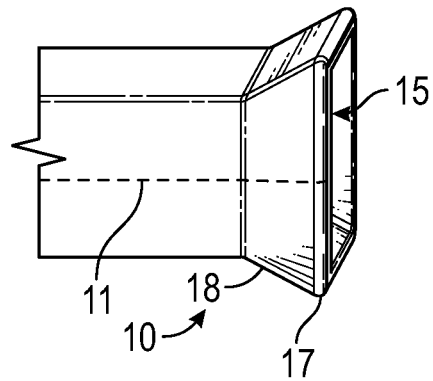
FIG. 2 is a perspective view of an end portion of exemplary hollow duct.
Figure 3:
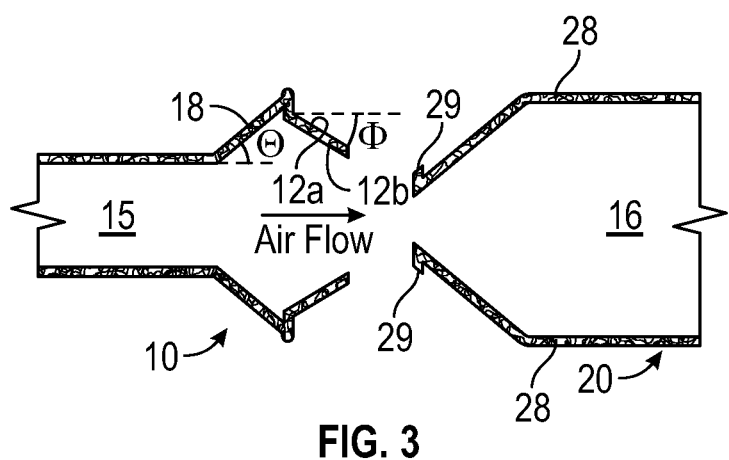
FIG. 3 is a schematic view of an exemplary hollow foam duct engageable with an exemplary vent or adapter.
Figure 4:
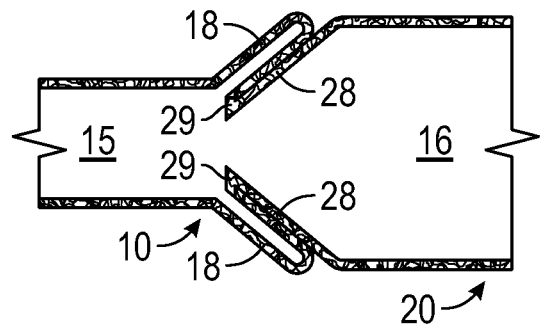
FIG. 4 is a schematic view of an exemplary hollow duct engaged with an exemplary vent or adapter.

Referring to FIGS. 1 and 2, an exemplary duct 10 is shown. Duct 10 has an interior surface surrounding airflow passage 15. Duct 10 has an end portion 13 adapted to connect to other ducts, vent adaptors, vents, or other structure. End portion 13 comprises flared section 18, lip 17, and tapered flap section 12. Flaps are inwardly foldable at the lip 17, such that flap outer surface 12a of a duct becomes an inner surface of duct 10 once folded. Flap inner surface 12b bends around to face a corresponding inner surface of a flared section 18. Lip 17, in the exemplified embodiment, has an upper surface flush with an outer surface of flared section 18, but includes an inward direction drop from which the tapered flap section extends. In automotive duct work example, the inward drop range in dimension from about 0.5 mm to about 2.5 mm. Without being bound by theory, the inward drop at the lip 17 may make the inward folding of the flap section easier to execute. FIG. 1 shows the tapered flap section 12 extended, while FIG. 2 shows the tapered flap section folded inwardly.

The duct 10 is to be connected to a vent or vent adaptor 20. The vent or vent adaptor 20 can be any structure in a ventilation system such as an HVAC system to which a duct 10 is to connect. The structure can be, need not be, the outermost vent where air is released to atmosphere. A vent adaptor is meant to describe any structure designed in one portion to fit together with duct 10 and designed in another portion to fit directly or indirectly with a vent. The vent or vent adaptor 20 can be made of any of a number of materials, including foam and/or plastic. Shapes of duct 10 and vent or vent adaptor 20 are not critical so long as the structures are mateable. In one embodiment, a duct 10 has a body with at least a portion thereof shaped substantially cylindrically; in another embodiment, at least a portion of the body is shaped substantially as a rectangular prism.

Referring to FIGS. 3-6, exemplary schematics are shown where duct 10 is connected to a vent or vent adaptor 20 where air passes from the duct through the vent or vent adaptor 20 from airflow passage 15 to airflow passage 16. The flared section 18 is flared outwardly from a body of the duct 10 at an angle $\Theta$ of from between 10° and 20°. The tapered flap section 12 extends from the lip and is tapered inwardly from a body of the duct 10 at an angle $\Phi$ of from between 10° and 20°. The angle $\Theta$ may be the same or different from the angle $\Phi$.

To join duct 10 together with vent or vent adaptor 20, one device is pushed into the other such that the ridges 29 press against the tapered flap sections 12 causing the flap sections 12 to fold inwardly at lip 17. Outer surface 12a is pushed flush against angled wall 28 and butt up against ridges 29. Inner surface 12b, after folding, now faces an interior surface of flared section 18. Inner surface 12b may or may not be in physical contact with an interior surface of flare section 18. In embodiments where inner surface 12b is not to be in contact with an interior surface of flare section 18, airflow through the passage 15 may enter the space between the inner surface 12b and the interior surface of the flare section 18, applying a force against the flap section tending to push or hold the flap section against the angled wall 28, thereby providing securement and reinforcement of the connection between duct 10 and vent or vent adaptor 20. Advantageously, when the connection between duct 10 and vent or vent adaptor 20 is made, tactile and/or auditory feedback provides confirmation of a properly secured connection.

Figure 5:
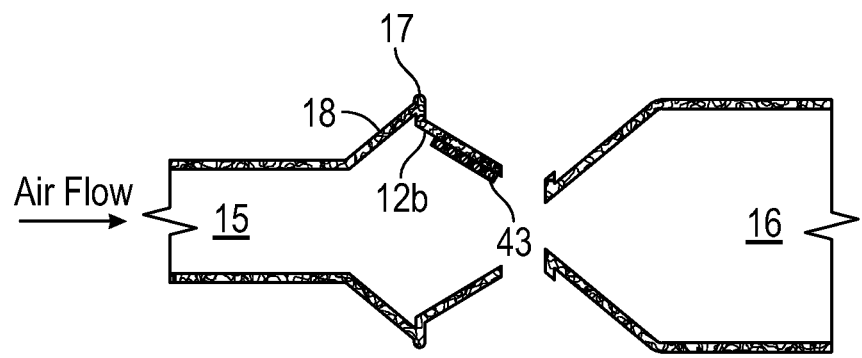
FIG. 5 is a schematic view of an exemplary hollow duct engageable with an exemplary vent or adapter.
Figure 6:
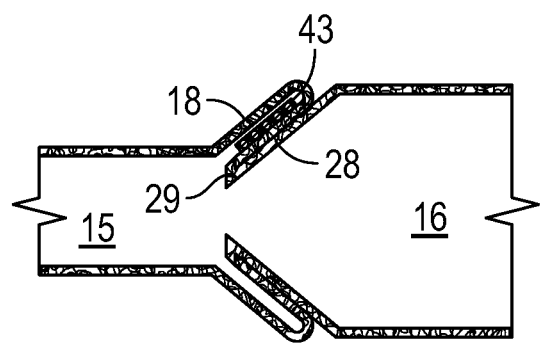
FIG. 6 is a schematic view of an exemplary hollow duct engaged with an exemplary vent or adapter.

Referring specifically the non-limiting example illustrated in FIGS. 5 and 6, an adhesive 43 is provided on an inner surface 12b of tapered flap section 12. Thus, when tapered flap section 12 is folded inwardly at lip 17, the adhesive 43 provides securement and stability of the connection between duct 10 and vent or vent adaptor 20. Adhesive 43 may be any of a number of unitary or composite structures. In one embodiment, adhesive 43 comprises an open-cell foam body with a chemical adhesive on one or both sides of the foam.

Duct 10 may comprise any of a number of materials, including plastics such as thermoplastics, thermosetting plastics and foamed materials. Exemplary plastics may include polyethylene and/or polypropylene. Where duct 10 is a rigid plastic material, the location for folding the tapered flap section may optionally be weakened by thinning of material at and/or around the lip 17 or by providing perforations at or around lip 17 for ease of folding without putting the tapered flap section at substantial risk of breaking off during operation in conditions typical of an HVAC environment. Fatigue and flexing properties (ASTM D-430 and D-813) of the folding joint/hinge should be sufficient to maintain the integrity of duct 10 in conditions typical of an HVAC environment. Where the duct 10 comprises plastic, mechanical properties of the materials, it may be sufficient impact strength, tensile modulus, and/or flexural strength (ASTM D-790 and D-747) to permit folding as desired and to withstand conditions typical of an HVAC environment.

As a non-limiting example where the duct comprises foam, duct 10 may be formed from a closed-cell, cross-linked polyolefin foam material. Exemplary polyolefin foam blends may comprise one or both of polypropylene and polyethylene. The percentage by weight of polypropylene and polyethylene in the polyolefin foam blend may vary as a result of the manufacturing process, but the percentage by weight of polypropylene may be higher than the percentage by weight of polyethylene. Suitable types of foam material are available through Toray Industries, Sekisui Voltek, Armacell, and Qycell Corporation. One non-limiting example may include Toray's Crosslinked Polyolefin Foam.

The foam sheets may have the same or different density and/or thickness. One or the other or both may have a density in the range of about 2 lb/ft$^3$ to 4.31 lb/ft$^3$, and more specifically, a density of about 4 lb/ft3. The foam sheets may have a thickness of about 4 mm. Other thicknesses and densities are contemplated, including those higher and lower than the exemplified ranges.

Duct 10 may be formed by any of a number of manufacturing methods. Where duct 10 is plastic, one or more components may be formed through one or more of any of a number of manufacturing processes including extrusion, casting, and injection molding. In a non-limiting example pertaining to foam ducts, duct 10 is formed by twin sheet processing two sheets of foam material, creating a seal 11. The foam sheets are properly sized. This may require the foam sheets to be cut or trimmed to a specific length and/or width. The size of the foam sheets may be determined by the size and shape of the foam air duct 10 that will be formed. In certain applications, the size of the foam sheets 14 may also be determined by the size of the press and the dimensions of an upper mold tool and a lower mold tool of the twin sheet processing tool. The foam sheets are engaged with a first frame a second frame. The foam sheets may be engaged with the frames using hydraulically operated mechanical clamps or any other suitable fastening mechanisms for holding the foam sheets in place during a heating operation. By clamping the foam sheets to the frames, the foam sheets may also be kept in tension during heating. The foam sheets may be introduced into a heating operation. The process may occur in an oven or any structure capable of heating the foam sheets to a predetermined temperature for a specific period of time. The temperature and time period to complete the heating process are dependent on the density and the thickness of the foam sheets being used to form the foam air duct. In one example, the foam sheets may be heated to a temperature in the range of about 250° F. to 400° F. When the foam sheets are heated within this temperature range, the sheets may be molded into the shape of the desired hollow foam air duct using the twin sheet forming tool including a press, the upper mold tool, and the lower mold tool.

The upper tool mold and the lower tool mold may include channels or any other suitable structures capable of removing air. Accordingly, a vacuum pump or any other suitable device may be applied to the upper tool mold causing the first foam sheet to take the form of the interior surface of the upper tool mold. This may create a first section of the foam air duct. Similarly, a vacuum pump or any other suitable device may be applied to the lower tool mold causing the second foam sheet to take the form of the interior surface of the lower tool mold. This may create a second section of the foam air duct. The upper tool mold and the lower tool mold may then be compressed together. The effect of the heated sheets and the pressure from the compression bonds the foam sheets together in the desired shape, forming a unified hollow foam air duct of a predetermined shaped.

With regard to the processes described herein, it should be understood that, although the steps of such processes, have been described as occurring in a certain sequence, such processes could be practiced with the described steps performed in an order other than the exemplary order. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A duct connection system, comprising:
    a vent or vent adaptor having an airflow passage and angled walls having an outer surface, said angled walls terminating in ridges; and
    a hollow duct body having an airflow passage and including an end portion having a flared section separated from a tapered flap section by a lip, the tapered flap section being inwardly foldable at the lip to form a secure connection with the vent or vent adaptor angled walls and ridges such that an outer surface of the flap section becomes an inner surface of the duct once it is engaged with the outer surface of the angled walls and ridges of the vent or vent adaptor; wherein the outer surface of the duct body end portion flap section is secured against the angled walls of the vent or vent adaptor with an adhesive.

2. The duct connection system of claim 1, wherein the hollow duct body comprises at least one of plastic or foam.

3. The duct connection system of claim 1, wherein the hollow duct body comprises at least one portion shaped substantially as a rectangular prism.

4. The duct connection system of claim 1, wherein the hollow duct body comprises at least one portion shaped substantially cylindrically.

5. The duct connection system of claim 1, wherein the end portion flared section has walls flaring outwardly from body portion at an angle Θ of from between 10° and 20°.

6. The duct connection system of claim 1, wherein the end portion flared section extends about an entirety of a periphery of the body, the flared section having walls flaring outwardly from body portion at an angle Θ of from between 10° and 20°.

7. The duct connection system of claim 1, wherein the lip provides an inward drop from an outer surface of a flared portion from which the tapered flap section extends.

8. The duct connection system of claim 7, wherein the lip provides an inward drop of from about 0.5 mm to about 2.5 mm.

9. The duct connection system of claim 7, wherein the tapered flap section extends downwardly from the lip at an angle Φ of from between 10° and 20°.

10. The duct connection system of claim 1, wherein the end portion of the duct body is engageable with the vent adaptor, the vent adaptor being engageable with the vent.

11. The duct connection system of claim 1 wherein said vent is an HVAC system.

12. A duct connection system, comprising:
a vent having an airflow passage and angled walls having an outer surface, said angled walls terminating in ridges; and
a duct body including an end portion having a flared section separated from a tapered flap section by a lip, the tapered flap section being inwardly foldable at the lip to form an inwardly folded tapered flap, such that the outer surface of the tapered flap section is directly engaged with the outer surface of the vent; wherein the outer surface of the duct body end portion flap section is secured against the angled walls of the vent or vent adaptor with an adhesive.

13. The duct connection system of claim 12, wherein the end portion flared section has walls flaring outwardly from body portion at an angle Θ of from between 10° and 20°.

14. The duct connection system of claim 12, wherein the end portion flared section extends about an entirety of a periphery of the body, the flared section having walls flaring outwardly from body portion at an angle Θ of from between 10° and 20°.

15. The duct connection system of claim 12, wherein the tapered flap section extends downwardly from the lip at an angle Φ of from between 10° and 20°.

16. The duct connection system of claim 12, wherein the duct body comprises foam.

17. The duct connection system of claim 12, further comprising connection reinforcement through an airflow force applied against the inwardly folded tapered flap against an angled wall in the vent.

18. The duct connection system of claim 12, wherein an airflow through the duct connection system forces the inwardly folded tapered flap against an angled wall in the vent to provide connection reinforcement with the duct body.

* * * * *